United States Patent Office 3,320,509
Patented May 16, 1967

3,320,509
STATIC APPARATUS FOR REGULATING THE RE-
CHARGING OF BATTERIES WITH CURRENT
SUPPLIED BY A THREE-PHASE GENERATOR
Antonio Guglielmi, Bologna, Italy, assignor to Ducati
Elettrotechnica S.p.A., Bologna, Italy
Filed June 10, 1964, Ser. No. 374,001
Claims priority, application Italy, Nov. 7, 1961,
20,242/61
3 Claims. (Cl. 320—39)

This application is a continuation-in-part of my copending application S.N. 225,290, filed on Sept. 21, 1962, now abandoned for Static Apparatus Regulating the Recharging of Batteries with Current Supplied by a Three-Phase Generator.

This invention relates, in general, to automatic regulating systems and more particularly to automatic regulator apparatus of the static type, i.e., which requires no moving parts, for the charging and recharging of the batteries from a three-phase alternating current source where the source is subject to large variations in current; for example, where the source comprises a three-phase A.C. generator mounted on a mobile power unit such as an automobile where the generator is inherently subject to great variations in speed of rotation.

The difficulties arising in regulating the current utilized to recharge batteries of the type used on vehicles such as automobiles and the like are due primarily to the fluctuations in the speed of rotation of the generator which is coupled to the engine of the vehicle and also to the substantial variations in the load requirements imposed on the power unit, including the generator and battery, while in use. Proper regulation occurs only if the battery charging current or voltage remains constant irrespective of the varying factors referred to above. The means presently known and utilized by those skilled in the art for regulating purposes as a rule comprise electromagnetic devices such as switches or relays, which fulfill the desired function in part only and moreover possess the inherent limitation of being partly composed of replaceable components, return springs, switching contacts and the like, all of which are liable to wear and malfunction over a long period of use. It was later proposed to utilize magnetic circuits comprising saturable reactors in the case of power units incorporating single phase generators. This resulted in an appreciable improvement; however the results obtained could not be considered to be wholly satisfactory due to the complex circulation required, substantial weight and size of the corresponding generator in addition to the time varying waveform of the voltage generated.

It is an object of the present invention, therefore, to provide an improved automatic regulating apparatus for a battery recharging system.

It is another object of the present invention to provide automatic static apparatus for regulating the recharging of a battery where the current and/or voltage supplied by a three-phase generator is controlled by means of magnetic reactors.

It is still another object of the present invention to provide an improved automatic regulator for recharging batteries utilized in vehicles where the recharging source is subject to variations in speed of revolution and loading.

It is still a further object of the present invention to provide an automatic regulator apparatus for the recharging of a battery from a three-phase alternating current without the use of moving parts.

Briefly, the subject invention comprises an electrical system for automatically regulating the recharging of a battery from a three-phase A.C. generator commonly referred to an an alternator, of the type comprising rotating permanent magnets, wherein said system comprises magnetic reactor means such as saturable reactors coupled between each phase of the generator to the battery, rectifier means directly connected between each said reactor means and said battery for rectifying the current from said generator in order to feed D.C. current into the battery from each of the three phases and circuit means including semiconductor elements coupled to the control winding of each reactor means for sensing the state of charge of the battery and applying control signals to the control windings for changing the impedance of the reactor means thereby allowing current to pass from said generator to said battery when the charge on said battery drops below a predetermined level.

Other objects and advantages of the present invention will become apparent after a study of the following detailed specification when read in connection with the accompanying drawings, in which.

Figure 1:
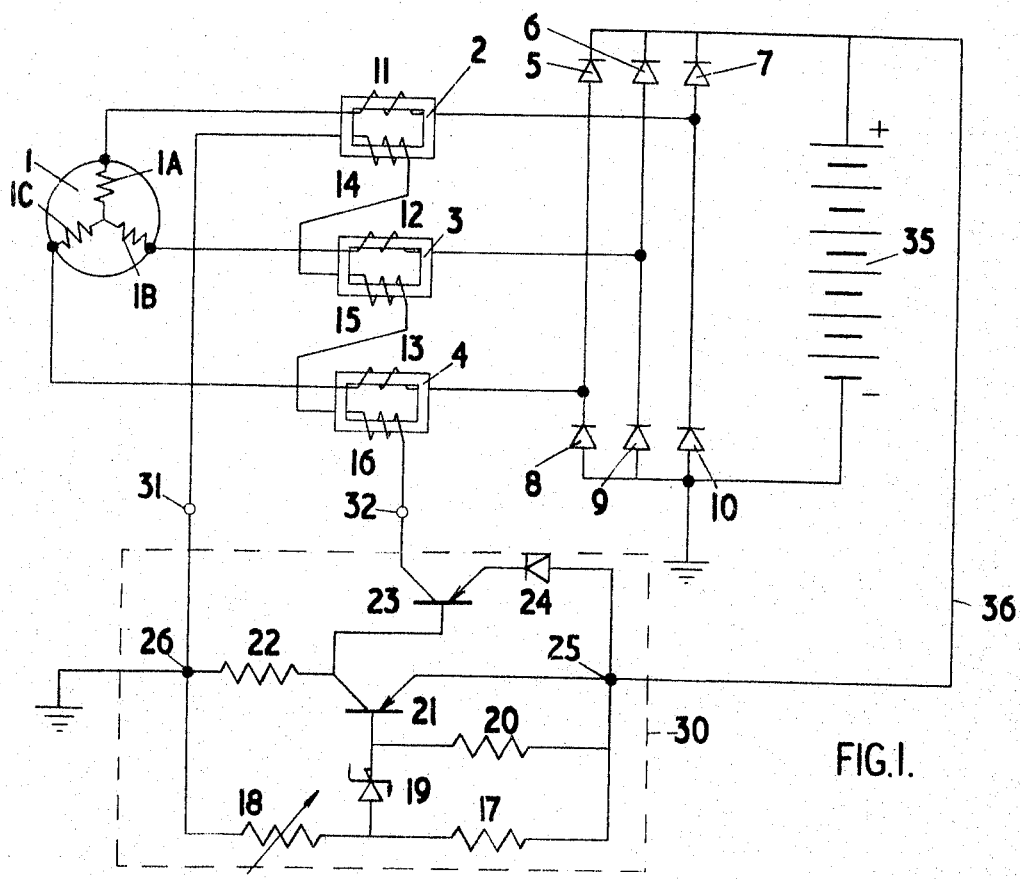
FIGURE 1 is a schematic circuit diagram illustrative of a first embodiment of the subject invention.

Referring to FIGURE 1, a three-phase alternating current generator 1 has phases 1A, 1B, and 1C coupled to the saturable reactor means 2, 3 and 4, respectively. In greater detail, phase 1A is connected to the secondary winding 11 of saturable reactor 2 which in turn is connected to the anode electrode of the rectifier 7. Likewise, phases 1B and 1C are connected through secondary windings 12 and 13 of saturable reactors 3 and 4 to the anode electrodes of rectifiers 6 and 5, respectively. Windings 14, 15 and 16 comprise the control windings of saturable reactors 2, 3 and 4 and are connected in series circuit relationship to terminals 31 and 32. The cathode electrodes of rectifiers 5, 6 and 7 are commonly connected to the positive terminal of the battery 35 while the anode electrode of rectifiers 8, 9 and 10 are commonly connected to the negative terminal of the battery 35 which is additionally returned to a point of reference potential hereinafter referred to as "ground."

The series connected control windings 14, 15 and 16 are coupled to a control circuit 30 at terminals 31 and 32. The control circuit 30 comprises a transistor 23, preferably of the power type, having its collector electrode connected to terminal 32. The base electrode of transistor 23 is commonly connected to the collector electrode of another transistor 21 and a resistor 22 which has its opposite end connected to junction 26. Junction 26 is returned to ground along with terminal 31 and one end of the adjustable resistance 18. The emitter electrode of transistor 23 is connected to junction 25 through the diode 24 while the emitter electrode of transistor 21 is directly connected to junction 25. Additionally, junction 25 is connected to the positive terminal of the battery by means of circuit lead 36 to one side of resistance 20. The opposite side of resistance 20 is coupled to the base electrode of transistor 21. Resistance 17 has one side connected to junction 25 while the opposite side thereof is coupled to the adjustable resistor 18. At the common connection of resistors 18 and 17 there is connected the anode electrode of a zener diode 19 which has its cathode electrode directly connected to the base electrode of transistor 21. The resistor 17 and the adjustable resistor 18 comprise a voltage divider network across junctions 25 and 26. Since the negative electrode of battery 35 is returned to ground, it is immediately evident that the voltage divider thus formed is connected across the battery potential. The purposes for this will be hereinafter described in greater detail.

In operation, the control circuit 30 controls the saturation of saturable reactors 2, 3 and 4 by means of the control windings 14, 15 and 16 respectively, which in turn changes the reactive impedance presented by windings 11, 12 and 13 to current tending to flow from the generator, to the battery 35. As those skilled in the art readily appreciate, a saturable reactor is an electrical device which selectively presents a relatively high or a low impedance to current flow depending upon the magnetic state of its core which is controlled by D.C. signal potential applied to a control winding. In the instant inventtion, when the saturable reactors 2, 3 and 4 are in their saturated states, current will pass from the generator 1 through the phases 1A, 1B and 1C through windings 11, 12 and 13 respectively, and thence through rectifiers 7, 6 and 5 to the positive terminal of the battery 35 during one-half cycle of alternating current while during the other or negative half cycle, current flows from phases 1A, 1B and 1C through rectifiers 10, 9 and 8 respectively to the negative terminal of the battery B. It is immediately seen therefore that when windings 11, 12 and 13 present a low impedance to current flow, a charging or recharging current, depending upon the prior state of the battery 35, will flow from the three phases 1A, 1B and 1C of generator 1 to the battery 35 over a complete cycle of the alternating current generated by generator 1.

As to when the windings 11, 12 and 13 present a low impedance to current flow from the generator 1, the control circuit 30 senses the state of charge of the battery 35 and accordingly transmits a control signal to the windings 14, 15 and 16 which are connected in series across terminals 31 and 32. The manner in which the control signal is produced will now be discussed. As noted before, the resistor 17 and the adjustable resistor 18 form a voltage divider network across the voltage appearing across terminals 25 and 26 which is also the potential appearing across the terminals of the battery 35. By selectively choosing the breakdown voltage of the zener diode 19 and by manually adjusting the valve of resistance 18, the voltage at which the full charge on the battery 35 can be calibrated and sensed at the common point of resistances 17 and 18 causing the zener diode to suddenly conduct and continue to remain conductive as long as the voltage at the common junction of resistances 17 and 18 remains at a predetermined level. At the point at which the zener diode 19 becomes conductive, base current will flow in transistor 21 rendering it conductive. The values of the resistors 17, 18 and 20 are selectively chosen such that upon becoming conductive transistor 21 is driven into saturation. Since the base electrode of transistor 23 is commonly connected to the collector electrode of transistor 21, the saturating of transistor 21 will prevent little base current from flowing in transistor 23 rendering it non-conductive and effectively providing an open circuit for current flow through the control windings 14, 15 and 16 which is coupled to the potential across junctions 25 and 26 through transistor 23 and diode 24. This condition then unsaturates the saturable reactors 2, 3 and 4 and effectively prevents current flow from traveling from the generator 1 towards the battery 35 due to the now relatively high impedance path provided by the windings 11, 12 and 13.

When the battery 35 becomes discharged, the voltage across junctions 25 and 26 will drop accordingly and the voltage across the zener diode 19 will fall below its sustaining potential and will therefore become non-conductive, thereby blocking base current of the transistor 21, rendering it non-conductive. When this occurs, base current of a sufficient magnitude is now allowed to flow in the base electrode of transistor 23 to drive transistor 23 into saturation and effectively providing a very low impedance for current flow from terminal 25 through the diode 24, the transistor 23 and the control windings 16, 15 and 14 to terminal 26. This current flow through the control windings will saturate the respective cores of the saturable reactors 2, 3 and 4 allowing recharging current to pass from generator 1 through the rectifiers 5 through 10 to recharge the battery 35 until such time that the potential across terminals 25 and 26 again reaches a level at which the zener diode 19 will again become conductive causing transistor 21 to saturate and causing transistor 23 to become non-conducting again.

It should also be noted that resistor 20 also serves as a shunt for the small leakage current of the zener diode 19. Diode 24, moreover produces a small voltage drop to compensate for the drop across transistor 21 when it is conducting and in its saturated state.

Figure 2:
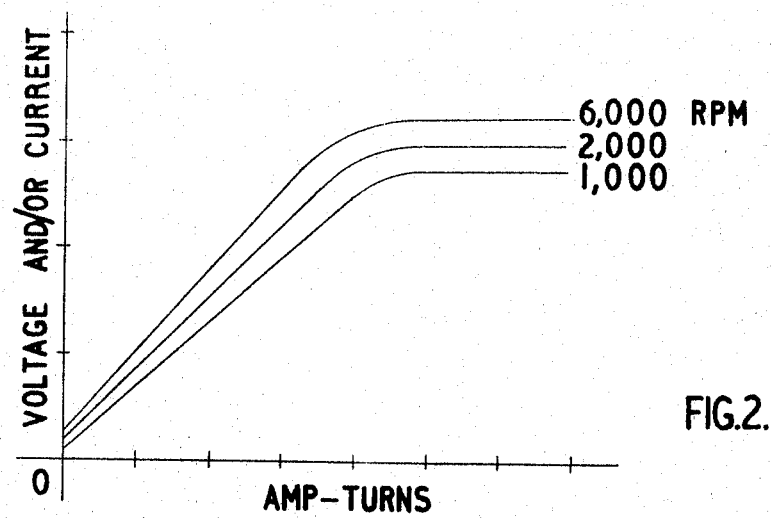
FIGURE 2 is a graph helpful in understanding the operation of the embodiment shown in FIGURE 1.

FIGURE 2 is a graph illustrative of the satisfactory degree of stabilization obtainable during fluctuation in the speeds of rotation of a driving engine and an A.C. generator, such as illustrated in FIGURE 1, connected to the driving engine. FIGURE 2 illustrates that between speeds of 1000 to 6000 r.p.m., only slight variations in voltage and/or current are applied to the respective rectifiers shown in FIGURE 1 for similar states of magnetization of the saturable reactors 2, 3 and 4.

Figure 3:
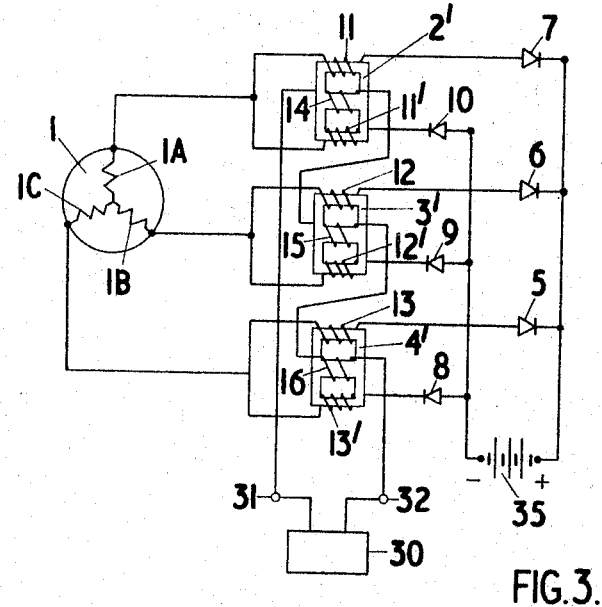
FIGURE 3 is a schematic diagram illustrative of a second embodiment of the subject invention.

The embodiment shown in FIGURE 3 is similar to the embodiment shown in FIGURE 1 with the exception that the saturable reactors of the present embodiment are of the self-saturable type. More particularly, saturable reactors 2', 3' and 4' are illustrated in FIGURE 3 and each comprises a three-legged core with a control winding 14, 15 and 16 respectively wound on the center leg. An additional winding 11', 12' and 13' is supplied on the third leg of the core in the return path for current which aids in the saturation of the respective core. For example, in the saturable reactor 2', the control winding is illustrated as winding 14. The secondary windings 11 and 11' are shown wound on the outer legs of the core and current passes from the phase 1A through winding 11 and the rectifier 7 to the battery 35 and returns through the winding 12' and 13' during one-half (positive) cycle of operation when the saturable reactor is rendered magnetized to a predetermined point by the winding 14, and current passes through winding 11' through the rectifier 10 and returns through the windings 11 and 13 during the second (negative) half-cycle of operation. Just as in the case with respect to the embodiment shown in FIGURE 1, the control windings 14, 15 and 16 are connected in series across the terminals 31 and 32 which in turn are coupled to a control circuit such as illustrated in FIGURE 1. The control windings moreover of each saturable reactor may be combined into a single unit, by winding the respective coils on a common structural and mounting layout.

Figure 4:
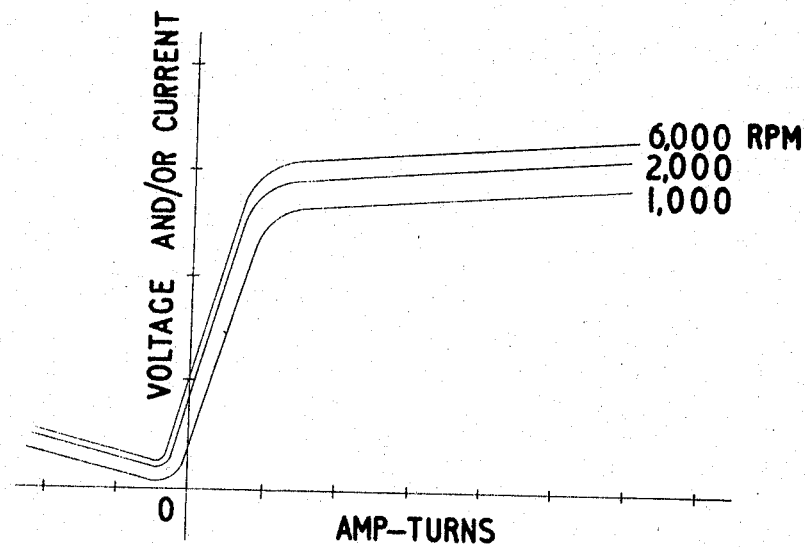
FIGURE 4 is a graph helpful in understanding the operation of the embodiment shown in FIGURE 3.

In operation, the embodiment in FIGURE 3 acts in the same manner as the embodiment in FIGURE 1, the only difference being in the magnetization characteristics of the saturable reactors 2', 3' and 4'. This characteristic is illustrated in FIGURE 4 and in addition to saturating much quicker than the saturable reactor shown in FIGURE 1, the general characteristic with respect to speed of rotation of the generator 1, it is substantially the same.

The present invention is attendant with significant weight and size reduction while the output corresponds to other apparatus of analogous nature. In addition, the generator described is preferably of a three-phase current type wherein the rotor is formed by permanent magnets. The degree of stabilization in the overall current provided thereby is considerably higher than in the case of conventional apparatus.

While there has been shown and described what are at present considered to be the preferred embodiments of the invention, modifications thereto will readily occur to those skilled in the art. It is not deisred, therefore, that the invention be limited to the specific arrangements shown and described but it is to be understood that all

What I claim is:

1. In an automatic static regulator for the charging of a battery: a three-phase alternator having a wide range of speeds; a plurality of magnetic reactors of the saturating and autosaturating type coupled to said alternator, each said plurality of magnetic reactors being provided with a control winding; means for connecting each said control winding in a series circuit connection across a pair of terminals; and control circuit means coupled to said pair of terminals for controlling the variations of ampere turns of each said control winding for varying the reactive impedance of its respective magnetic reactor, said circuit means comprising a variable resistor and a fixed resistor connected in series at a first junction, means for coupling the opposite terminal of said variable resistor with respect to said first junction to a point of reference potential and to a negative terminal of said battery, means for connecting the other terminal of said fixed resistor with respect to said first junction to a positive terminal of said battery, a zener diode having its anode electrode connected to said first junction, a second fixed resistor connected between the cathode electrode of said zener diode and said positive terminal of said battery, a first transistor including circuit means for coupling the base electrode thereof to said cathode electrode of said zener diode, said zener diode being selectively conductive in accordance with the potential at said first junction for controlling the conductive state of said first transistor, and a second transistor coupled between said first-mentioned transistor, and said pair of terminals and including means for being coupled to said positive terminal of said battery through a diode being conductive when said first-mentioned transistor is nonconductive and being non-conductive when said first transistor is conductive; and rectifier means directly coupled to each said plurality of magnetic reactors for supplying a direct current to said battery in accordance with the operation of said plurality of magnetic reactors.

2. In an automatic static regulator for the charging of batteries from a three-phase alternating curent generator: a plurality of magnetic reactors of the saturated and autosaturated type coupled to said generator, each said plurality of magnetic reactors having at least one control winding connected in series with at least one control winding of the other of said plurality of magnetic reactors, said at least one control winding being effective to control the magnetic state of its respective magnetic reactor in accordance with a control signal; means for generating said control signal comprising a variable resistor and a fixed resistor connected in series at a first junction, means for coupling the other end of said variable resistor to a point of reference potential and to one terminal of said battery, means for coupling the other end and said fixed resistor to an opposite terminal of said battery, a zener diode having one of its terminals connected to said first junction, a first transistor having its base electrode coupled to the opposite electrode of said zener diode, a second fixed resistor coupled between said base electrode of said first transistor and said opposite terminal of said battery, a second transistor coupled between said first transistor and each said at least one control winding of said plurality of saturable said magnetic reactors, diode means coupling said opposite terminal of said battery to said second transistor for directing current to said control windings through said second transistor during the conduction state thereof, and a third fixed resistor commonly coupled between said first and said second transistors and said one terminal of said battery, said circuit thus being adaptable to sense the state of charge of said battery and selectively vary the conductive state of said first and said second transistors for providing a control signal which directs current to said each control winding when said battery is in need of recharging.

3. Automatic regulator apparatus for charging a battery comprising in combination: a three-phase alternator adapted to be coupled to an engine and operate over a wide range of speed; a magnetic reactor connected in each phase of said alternator and having at least one control winding and one secondary winding; means for coupling each said at least one control winding in a series circuit combination across a pair of terminals; rectifier means coupled directly between said battery and said at least one secondary winding of each magnetic reactor for rectifying current supplied to said battery from said alternator; and a control circuit coupled between said pair of terminals and said battery for sensing the voltage on said battery and including at least one transistor which is adapted to become selectively conductive depending upon the voltage state of said battery and a second transistor coupled to and controlled by said first transistor for supplying current to said series circuit combination when said first transistor is made selectively non-conductive when said battery voltage is at a relatively low magnitude and interrupting current flow to said control windings when said first transistor becomes conductive upon the battery attaining a predetermined voltage indicative of a full charge condition.

References Cited by the Examiner

UNITED STATES PATENTS

| 2,333,617 | 11/1943 | Smith | 320—15 |
|---|---|---|---|
| 2,628,340 | 2/1953 | Potter | 323—89 X |
| 2,978,633 | 4/1961 | Medlar | 323—89 |
| 3,098,962 | 7/1963 | Berg | 320—39 |

JOHN F. COUCH, *Primary Examiner.*

S. WEINBERG, *Assistant Examiner.*